United States Patent
Lagnado

(10) Patent No.: US 7,561,904 B2
(45) Date of Patent: Jul. 14, 2009

(54) SYSTEMS AND METHODS FOR MANAGING ANTENNA USE

(75) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 11/259,687

(22) Filed: Oct. 26, 2005

(65) Prior Publication Data

US 2007/0093270 A1 Apr. 26, 2007

(51) Int. Cl.
*H04M 1/00* (2006.01)

(52) U.S. Cl. ............... 455/575.7; 455/101; 455/552.1; 343/702

(58) Field of Classification Search ............... 455/41.2, 455/41.3, 63.1, 67.13, 90.3, 101, 550.1, 552.1, 455/553.1, 556.1, 556.2, 562.1, 575.1, 575.7; 375/267; 343/702
See application file for complete search history.

(56) References Cited

U.S. PATENT DOCUMENTS

| | | | |
|---|---|---|---|
| 6,531,985 B1 * | 3/2003 | Jones et al. ............ | 343/702 |
| 6,642,892 B2 * | 11/2003 | Masaki et al. ............ | 343/702 |
| 6,687,120 B2 * | 2/2004 | Hood et al. ............ | 361/679.09 |
| 6,959,209 B2 * | 10/2005 | Fang ............ | 455/571 |
| 7,043,209 B2 * | 5/2006 | Hirota ............ | 455/101 |
| 7,123,196 B2 * | 10/2006 | Masaki ............ | 343/702 |
| 7,167,726 B2 * | 1/2007 | Ghosh et al. ............ | 455/557 |
| 7,340,236 B2 * | 3/2008 | Liang et al. ............ | 455/277.2 |
| 7,440,730 B2 * | 10/2008 | Aloni-Lavi et al. ......... | 455/63.1 |
| 7,522,109 B2 * | 4/2009 | Shimasaki et al. ............ | 343/702 |
| 2002/0111194 A1 * | 8/2002 | Behbahani et al. ............ | 455/566 |
| 2002/0137472 A1 * | 9/2002 | Quinn et al. ............ | 455/90 |
| 2005/0170862 A1 * | 8/2005 | Fukushima ............ | 455/556.1 |
| 2007/0037619 A1 * | 2/2007 | Matsunaga et al. ............ | 455/575.7 |
| 2007/0041470 A1 * | 2/2007 | Palaskas et al. ............ | 375/297 |
| 2007/0218853 A1 * | 9/2007 | Yu ............ | 455/272 |

FOREIGN PATENT DOCUMENTS

JP 2004-32462 1/2004

\* cited by examiner

*Primary Examiner*—Charles N Appiah
*Assistant Examiner*—Anthony S Addy

(57) ABSTRACT

In one embodiment, a method for controlling antenna use in a computing device comprises determining which wireless transceiving devices are active, and if multiple wireless transceiving devices are active, disabling transmission/reception diversity such that each wireless transceiving device may only use one respective antenna.

20 Claims, 8 Drawing Sheets

SYSTEMS AND METHODS FOR MANAGING ANTENNA USE

BACKGROUND

Modern computing devices are often configured for wireless communications. Moreover, such computing devices are often configured for simultaneously communicating using multiple wireless technologies. For example, a notebook computer may be configured to connect to a wireless local area network (WLAN) through the Institute of Electrical and Electronics Engineers (IEEE) 802.11 protocol or to a wireless wide area network (WWAN), and to connect to various peripheral devices using the Bluetooth protocol. With such an arrangement, for example, music can be wirelessly streamed to the computing device and then wirelessly transmitted to the user's wireless headset.

When a computing device is enabled to communicate using two or more wireless technologies, separate transceiving devices are provided within the computing device, each typically comprising its own antenna. For example, the computing device may comprise an 802.11 transceiving device having a first antenna and a Bluetooth transceiving device having a second antenna. In some cases, two or more separate antennas are provided for a given transceiving device so that the antenna that can transmit and/or receive the strongest signals can be utilized.

Communicating using one wireless technology can interfere with communications of another wireless technology of the computing device. More particularly, transmissions from a first antenna using a first wireless technology may interfere with reception of signals with a second, proximate antenna using a second wireless technology due to the relatively high power normally required for wireless transmission. This can be true even when the two wireless technologies use different frequency bands.

BRIEF DESCRIPTION OF THE DRAWINGS

The disclosed systems and methods can be better understood with reference to the following drawings. The components in the drawings are not necessarily to scale.

DETAILED DESCRIPTION

As is described above, simultaneous communications using two or more different wireless technologies can create problems with interference. In particular, the transmissions from a first antenna can create interference for reception of signals with a second, proximate antenna. Therefore, desired is a solution in which transmission/reception diversity is available at least when no other wireless technology is active. As is used herein, transmission/reception diversity" refers to control over the antenna(s) used to transmit, receive, or transit and receive data.

Disclosed in the following are systems and methods for managing use of a computing device's antennas to avoid interference that can slow or even prevent wireless communication with a second wireless technology. According to the systems and methods, antennas are, in essence, enabled or disabled for use based upon which wireless technologies are active. With such a system, transmission/reception diversity is enabled when no other wireless technology is in use. Upon another wireless technology coming into use, transmission/reception diversity is disabled, and the antennas are enabled and disabled in a manner in which any transmitting antenna is spaced relatively far from any receiving antenna. Although particular embodiments of the systems and methods are disclosed in the following, these embodiments are provided for purposes of example only to facilitate description of the disclosed systems and methods.

Figure 1:
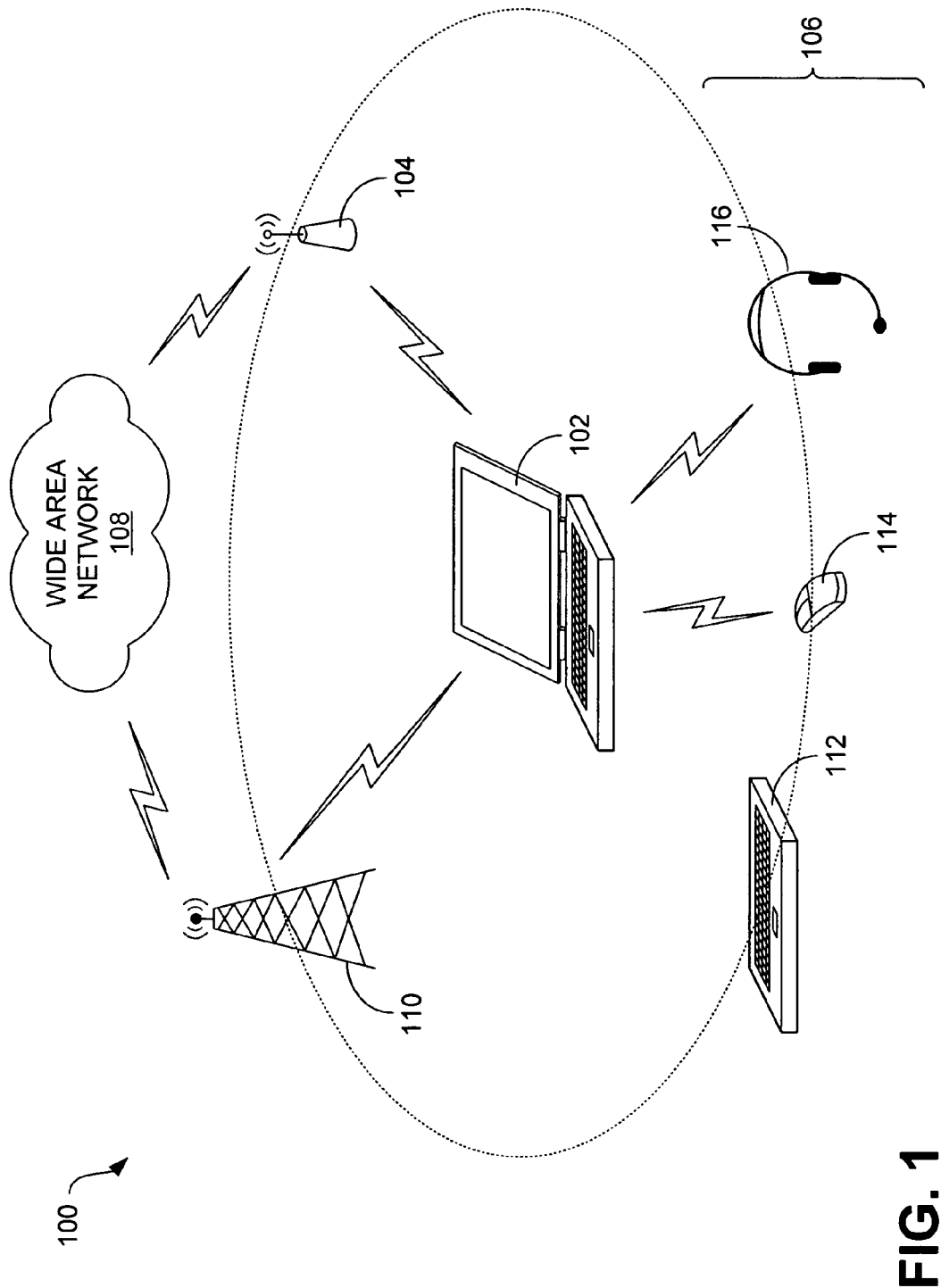
FIG. 1 is a schematic view of an embodiment of a system in which antenna management can be performed.

Referring now in more detail to the drawings, in which like numerals indicate corresponding parts throughout the several views, FIG. 1 illustrates an example system 100 in which antenna management can be performed. As is indicated in that figure, the system 100 generally comprises a user computing device 102 that is configured for wireless communications using two or more different wireless technologies. In the example of FIG. 1, it is assumed that the computing device 102 is configured for communication with a wireless access point (WAP) 104 of a wireless local area network (WLAN), with one or more wireless user interface devices 106, and optionally with a wide area network (WAN) via a communication (e.g., cell) tower 110.

In the embodiment of FIG. 1, the computing device 102 is a notebook, or "laptop," computer. Although the computing device 102 need not comprise a notebook computer, such portable computers are often configured for wireless communications, particularly with LANs that incorporate an access point, such as the WAP 104. Other examples of computing devices that may be used in the system 100 include, but are not limited to, desktop computers and handheld computers, such personal digital assistants (PDAs), tablets, gaming handhelds, and mobile telephones.

The example wireless user interface devices 106 of FIG. 1 include a wireless keyboard 112, a wireless mouse 114, and a wireless headset 116. When provided, the wireless headset 116 can be configured to receive and/or transmit audio signals from and to the computing device 102. Other example wireless user interface devices may include, but are not limited to, wireless video headsets and wireless stereo headphones.

Communications between the computing device 102 and the WAP may be via any available or yet to be created wireless protocol. By way of example, the IEEE 802.11b or 802.11g protocol may be used. In similar manner, communications between the computing device 102 and the wireless user interface devices 106 may be via any available or yet to be created wireless protocol. By way of example, the Bluetooth (IEEE 802.15) protocol may be used to facilitate communications between the computing device 102 and the wireless user interface devices 106. Finally, communications between the computing device 102 and the WAN 108 may also be via a wireless protocol, such as wireless wide area network (WWAN) protocol via code division multiple access (CDMA) or general packet radio service (GPRS). In at least some embodiments, two or more different wireless technologies are available for simultaneous use.

Figure 2:
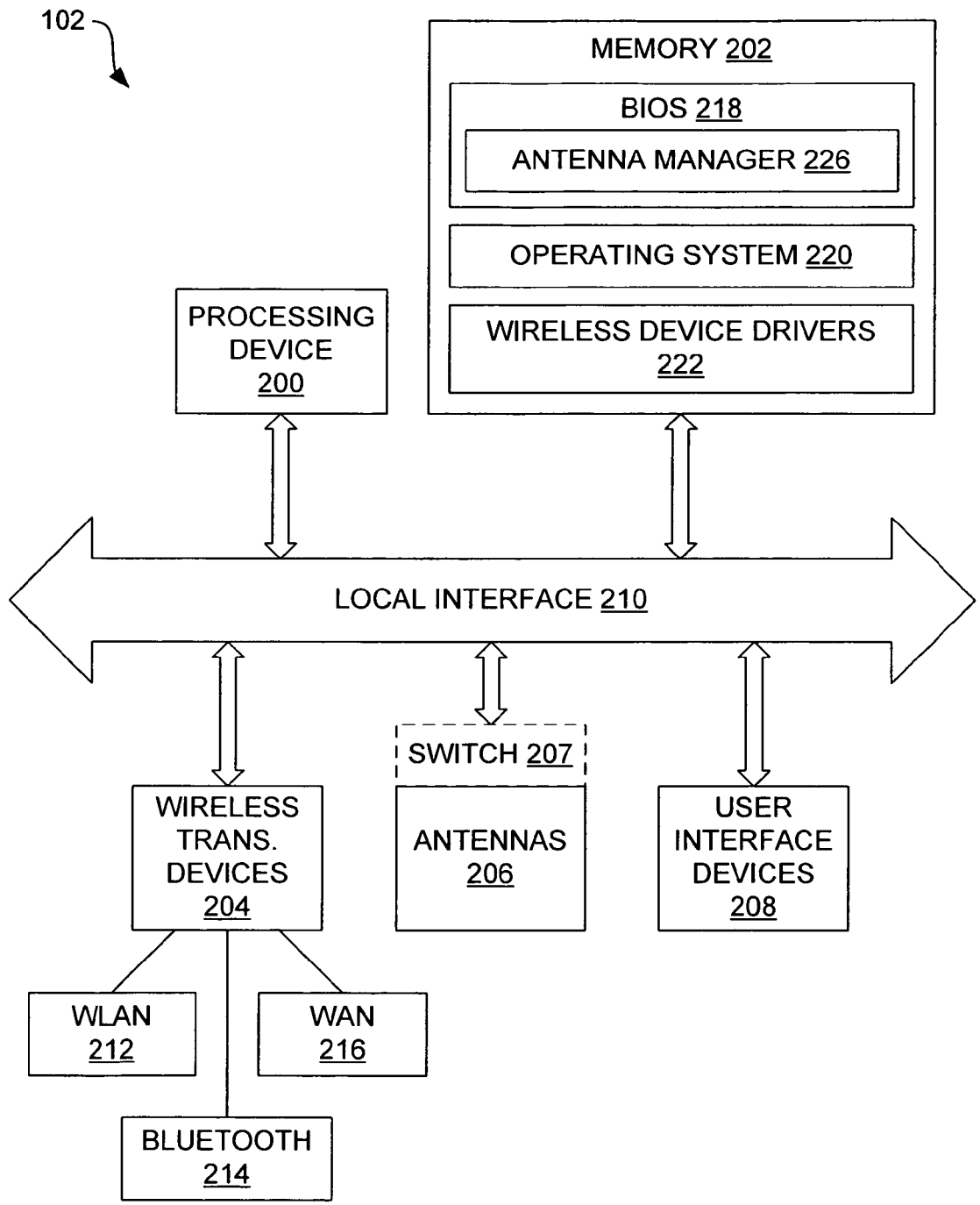
FIG. 2 is a block diagram of an embodiment of a computing device shown in FIG. 1.

FIG. 2 is a block diagram illustrating an example architecture for the computing device 102 shown in FIG. 1. As is indicated in FIG. 2, the computing device 102 comprises a processing device 200, memory 202, wireless transceiving devices 204, antennas 206, and user interface devices 208. Each of those components is connected to a local interface 210, such as an internal bus.

The processing device 200 is adapted to execute commands stored in memory 202 and can comprise a general-purpose processor such as a microprocessor, one or more application-specific integrated circuits (ASICs), a plurality of suitably-configured digital logic gates, or other components comprised of discrete devices that coordinate the overall operation of the computing device 102. The memory 202 comprises any one or a combination of volatile memory elements (e.g., random access memory (RAM)) and nonvolatile memory elements (e.g., read-only memory (ROM), Flash memory, hard disk, etc.).

The wireless transceiving devices 204 comprise devices that are capable of generating wireless signals for transmission and receiving such signals, or both. In the example embodiment of FIG. 2, the wireless transceiving devices 204 include a WLAN device 212, a Bluetooth device 214, and a WAN device 216.

The memory 202 includes various programs including a basic input-output system (BIOS) 218, an operating system (O/S) 220, and wireless device drivers 222. The BIOS 218 comprises code that controls low-level operation of the computing device 102 and its component, including the wireless transceiving devices 204 and the antennas 206. The BIOS controls activities and all components of the computing device, including transceiving devices. The O/S 220 provides scheduling, input-output control, file and data management, memory management, and communication control, and that controls general operation of the computing device 102 from the perspective of the user. The drivers 222 comprise software that controls operation of the wireless transceiving devices 204 and, as is described below, the antennas that are used to communicate using the transceiving devices. Typically, a separate driver 222 is used to control each wireless transceiving device 204.

As is further indicated in FIG. 2, the BIOS 218 comprises an antenna manager 226 that is used to automatically control which antennas are used by which wireless technology comprised by the computing device 102. In some embodiments, the antenna manager 226 is used to control the device drivers 222 to effect control over antenna use. In other embodiments, the antenna manager 226 directly controls the antennas 206 through use of the switches 207. In some embodiments, antenna manager 226 forms part of the BIOS 218. In other embodiments, antenna manager 226 is not part of the BIOS 218, but is able to access the BIOS to obtain the status of each transceiving device at any particular moment. Accordingly, manager 226 is informed of any change of state of transceiving devices, such as its activation.

Various logic has been described herein. This logic can be stored on any computer-readable medium for use by or in connection with any computer-related system or method. In the context of this document, a computer-readable medium is an electronic, magnetic, optical, or other physical device or means that contains or stores a computer logic for use by or in connection with a computer-related system or method. This logic can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 3A:
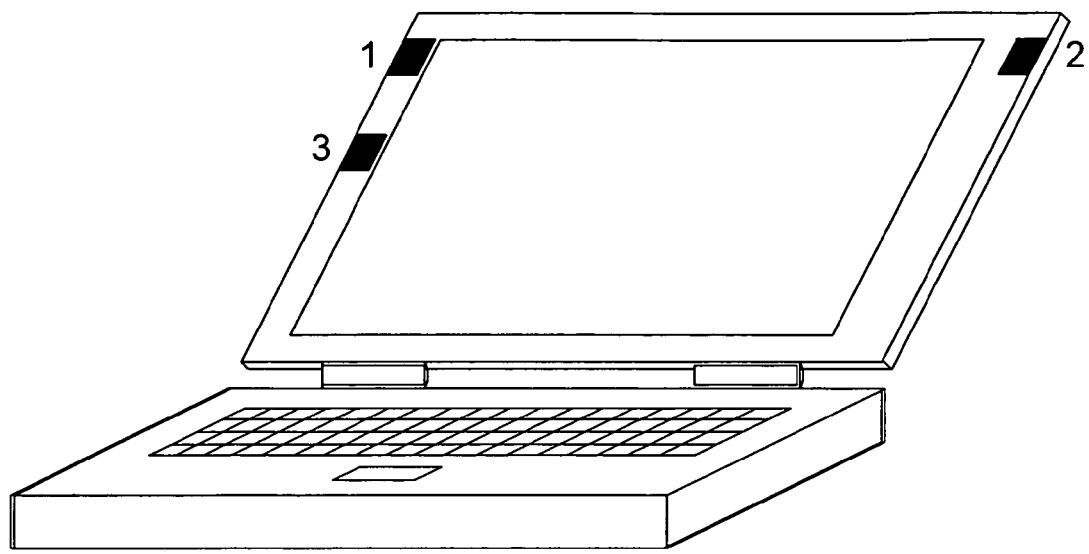
FIGS. 3A and 3B are schematic views of first and second example antenna configurations for a computing device, such as that of FIG. 2.
Figure 3B:
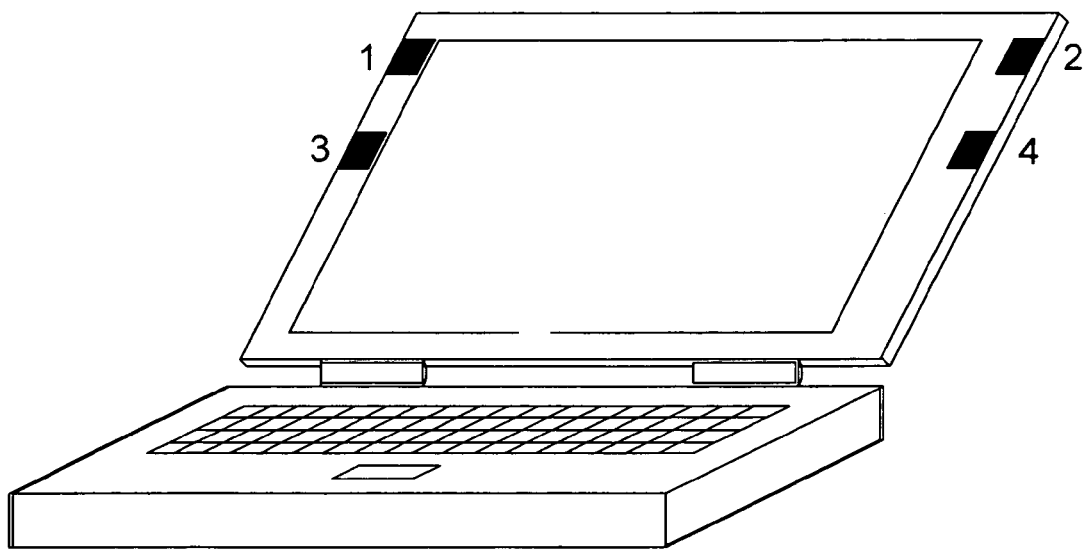

Referring to FIGS. 3A and 3B, illustrated are first and second example antenna configurations for the computing device 102. With reference first to FIG. 3A, the computing device 102 comprises three antennas: antenna 1, antenna 2, and antenna 3. As is indicated in FIG. 3A, antennas 1 and 3 are relatively proximate to each other, while antenna 2 is relatively distant to antennas 1 and 3. By way of example, antennas 1 and 2 are used by a first wireless technology, such as the WLAN transceiving device 212, and antenna 3 is used by a second wireless technology, such as the Bluetooth transceiving device 214 (see FIG. 2). With such a scheme, transmission/reception diversity may be used in conjunction with WLAN (e.g., 802.11) communications. Therefore, if, for example, stronger signals are received with antenna 1 as compared to antenna 2, antenna 1 can be enabled for communications and antenna 2 can be disabled.

With reference to FIG. 3B, the computing device 102 comprises four antennas: antenna 1, antenna 2, antenna 3, and antenna 4, with antennas 1 and 3 being relatively proximate to each other and antennas 2 and 4 being relatively proximate to each other but relatively distant to antennas 1 and 3. By way of example, antennas 1 and 2 are used by a first wireless technology (e.g., 802.11) and antennas 3 and 4 are used by a second wireless technology (e.g., CDMA, GPRS). In such a scheme, transmission/reception diversity is available, for example, in both WLAN and WAN communications.

Example systems having been described above, operation of the systems will now be discussed. In the discussions that follow, flow diagrams are provided. Process flow or blocks in these flow diagrams may represent modules, segments, or portions of code that include one or more executable instructions for implementing specific logical functions in the process. Although particular example process functions are described, alternative implementations are feasible. Moreover, portions may be executed out of order from that shown or discussed, including substantially concurrently or in reverse order, depending on the functionality involved.

Figure 4:
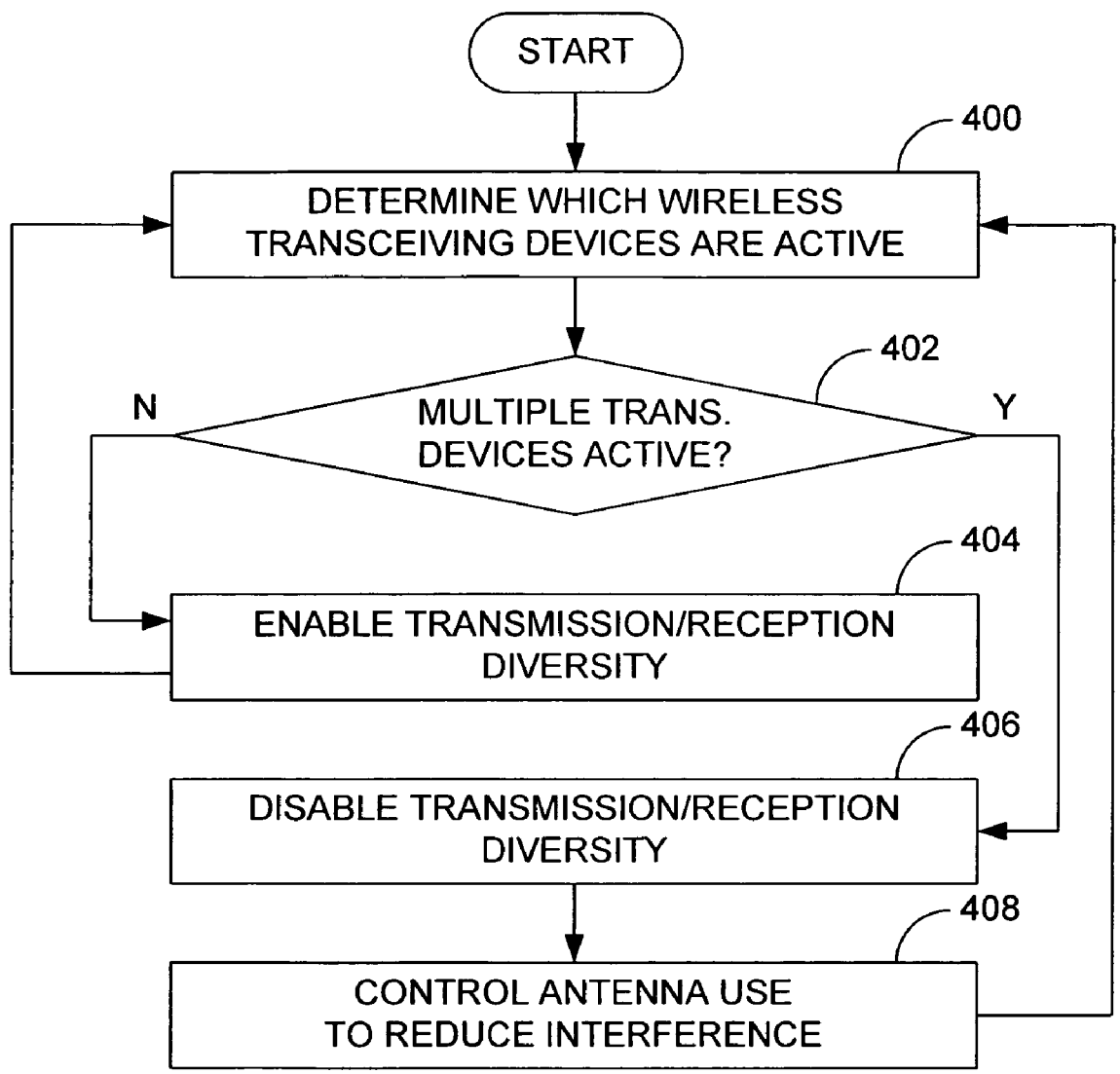
FIG. 4 is a flow diagram that illustrates a first embodiment of a method for managing antenna use.

FIG. 4 illustrates an example method embodiment for managing antenna use that provides an overview of the conceptual operation of the antenna manager 226. Beginning with block 400, the manager 226 determines which wireless transceiving devices are active. The manager 226 bases this determination on the BOIS-listed states of each device of the computer.

Referring next to block 402, flow depends upon whether multiple transceiving devices are or are not active. In terms of being "active," the determination can depend upon whether the device is turned on and therefore ready to transmit and/or receive. Alternatively, "active" can mean that a device is actively transmitting signals using an antenna. If multiple transceiving devices are not active, meaning that either no such devices are active or only one such device is active, the antenna manager 226 enables transmission/reception diversity, as indicated in block 404. Therefore, if a transceiving device having two antennas is active, that device is free to use either antenna and therefore can select the antenna with which the strongest signals can be transmitted and/or received.

If, on the other hand, multiple transceiving devices are active, flow continues to block 406 at which the antenna manager 226 disables transmission diversity such that each device 204 can only use one antenna for its communications. Moreover, as is indicated in block 408, the manager 226 controls antenna use so as to reduce interference between the multiple communications. Such control can be explained in relation to FIGS. 3A and 3B. As is described above, a first wireless technology (e.g., 802.11) is associated with antennas 1 and 2, while a second wireless technology (e.g., Bluetooth) is associated with antenna 3. If interference is to be reduced, it is desirable to have the first wireless technology use antenna 2 so that the antennas used for wireless communications are physically spaced a greater distance from each other. The manager 226 can therefore, in effect, disable antenna 1 and enable antenna 2 to ensure such a result. Referring to FIG. 3B, assuming a first wireless technology uses antennas 1 and 2 and a second wireless technology uses antennas 3 and 4, the manager 226 can control antenna use so that the first wireless technology uses antenna 1 when the second wireless technology uses antenna 4, or the first wireless technology uses antenna 2 when the second wireless technology uses antenna 3. Therefore, in any case, the manager 226 controls multiple wireless technologies such that they use antennas that are most distant from each other. In such a scheme, transmission from a first antenna using a first wireless technology is less likely to interfere with reception of signals at a second antenna using a second wireless technology.

Figure 5:
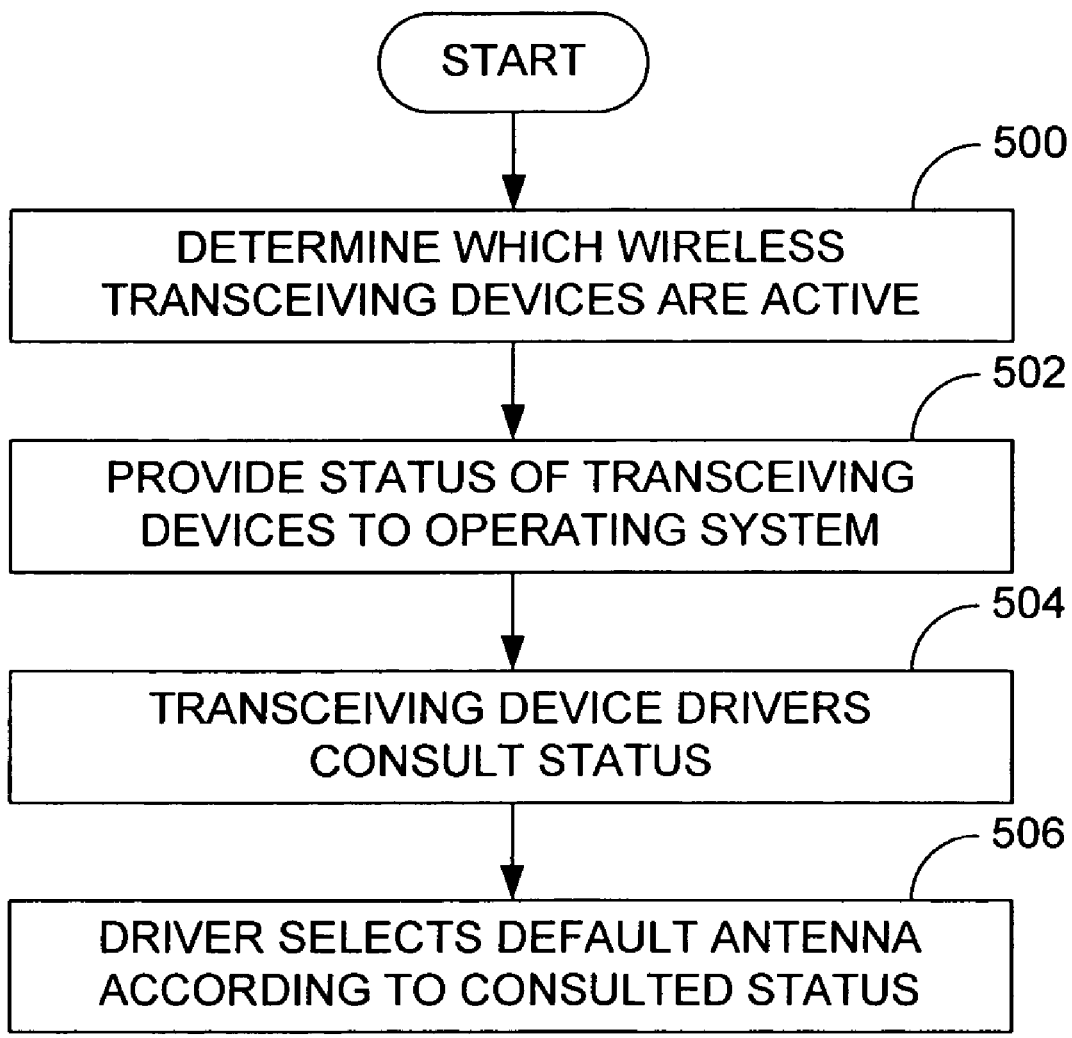
FIG. 5 is a flow diagram that illustrates a second embodiment of a method for managing antenna use.

FIG. 5 describes a further method embodiment for managing antenna use. In this embodiment, the antenna manager 226 controls antenna use by providing status information to the transceiving device drivers 222. Beginning with block 500, the manager 226 determines which wireless transceiving devices are active or inactive, as described above in relation to FIG. 4.

Referring next to block 502, the manager 226 provides the status of the transceiving device(s) to the operating system O/S. For example, when the status of a transceiving device is changed from inactive to active, this status is reported to the O/S. By way of example, the status of the transceiving device is updated in a look-up table contained in the O/S that is accessible to the drivers for the transceiving devices. In addition to indicating the status, the look-up table can comprise associated default antenna enablement/disablement indications that depend upon transceiving device status. For example, referring to FIG. 3A, if antennas 1 and 2 are associated with a first wireless technology and antenna 3 is associated with a second wireless technology, antenna 2 of antennas 1 and 2 can be designated as the default antenna to be used if the transceiving devices of both the first and second wireless technologies are active, so that the antenna of the first wireless technology most distant to antenna 3 will be used.

Once that status is provided to the O/S, the device drivers consult the status information to determine which antenna to enable or disable, if applicable, as indicated in block 504. By way of example, this consultation occurs periodically such that an antenna change can be dynamically made upon a change of state of a transceiving device. Referring to block 506, the driver(s) select the default antenna according to the information gleaned from consulting the status provided by the antenna manager 226. For instance, referring again to FIG. 3A, if the transceiving device 212 (FIG. 2) is transmitting over antenna 1 and transceiving device 214 later begins receiving over antenna 3, the driver associated with transceiving device 212 can learn of this status change (block 504), and therefore switches to transmitting over antenna 2 (block 506).

Figure 6:
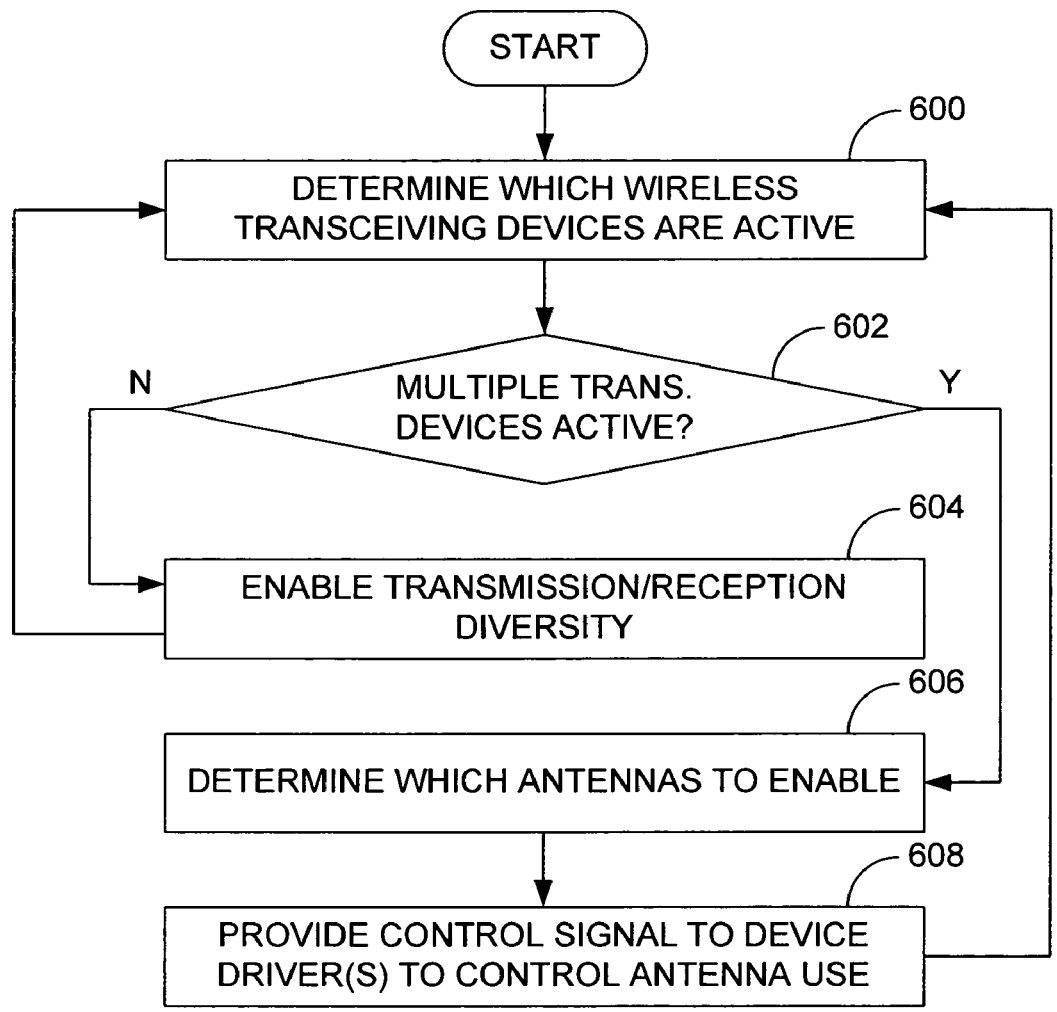
FIG. 6 is a flow diagram that illustrates a third embodiment of a method for managing antenna use.

FIG. 6 describes another method embodiment for managing antenna use. In this embodiment, the antenna manager 226 controls antenna use by sending control signals to the device drivers 222. Referring to block 600, the manager 226 determines which wireless transceiving devices are active, in the manner described above. With reference to block 602, if multiple transceiving devices are not active, the manager 226 enables transmission/reception diversity, as indicated in block 604. In other words, the manager 226 does not act to limit antenna use by the transceiving devices so that they are free to switch between antennas as needed.

If multiple transceiving devices are active, however, flow continues to block 606 at which the manager 226 determines which antenna(s) to enable and which to disable. For example, referring to FIG. 3B, if antennas 1 and 2 are associated with a first wireless technology and antennas 3 and 4 are associated with a second wireless technology, and assuming that the first wireless technology is already active and using antenna 1, the antenna manager 226 can determine that, if the second wireless technology later becomes active, to have that technology use antenna 4, which is most distant to antenna 1.

Next, the antenna manager 226 provides a control signal to the device driver(s) associated with the transceiving device(s) to control which antenna is used by the transceiving device(s), as indicated in block 608. The control signal can take various different forms. By way of example, if the Windows Management Instrumentation (WMI) service is registered for BIOS events, the BIOS can use the WMI service to make specific functions calls to the driver in order to initiate a change in diversity behavior. The function call to the driver can enable or disable diversity for the specified wireless device, as required by the antenna manager 226.

Figure 7A:
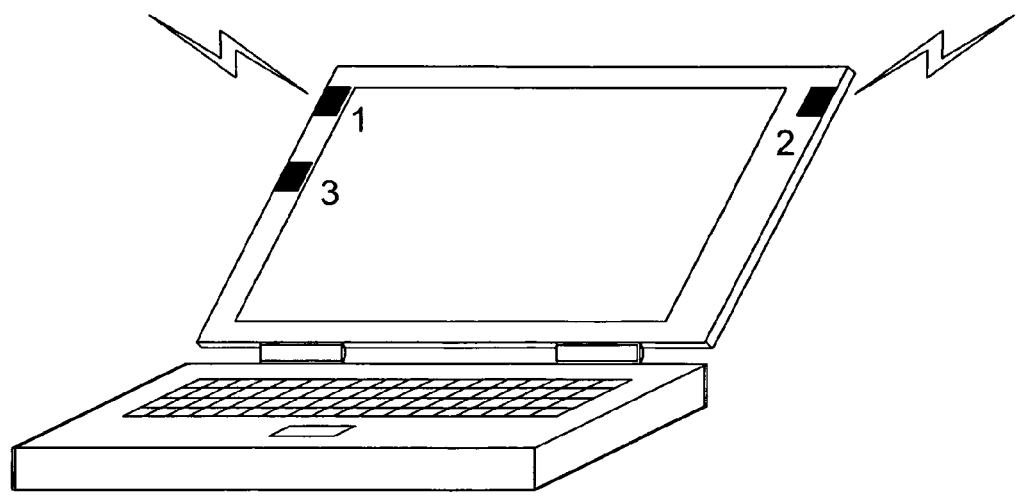
FIGS. 7A and 7B illustrate example antenna management schemes for a first antenna configuration.
Figure 7B:
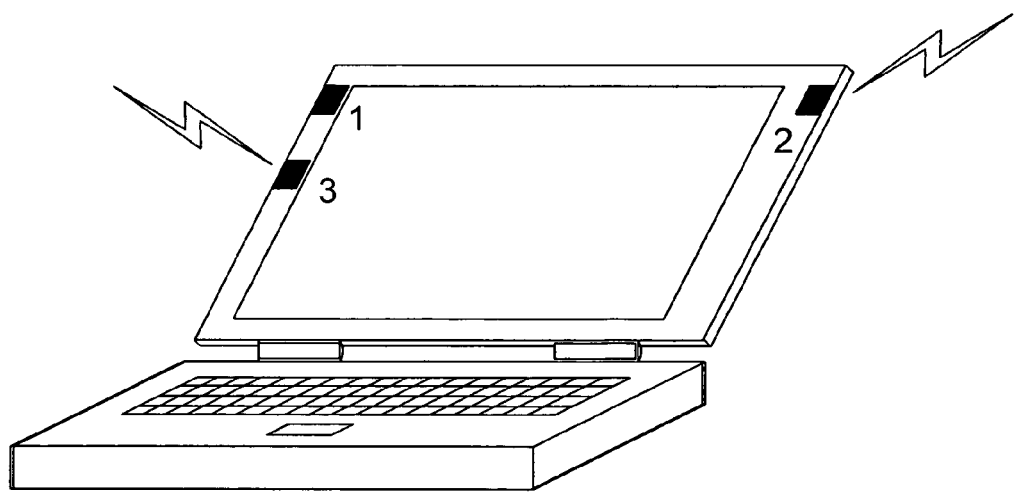

FIGS. 7A-B and 8A-8D illustrate example antenna management schemes consistent with the foregoing method embodiments. In FIGS. 7A and 7B, the computing device comprises a configuration similar to that described in relation to FIG. 3A. In FIGS. 8A-8D, the computing device comprises a configuration similar to that described in relation to FIG. 3B.

Beginning with FIG. 7A, antennas 1 and 2, associated with a first wireless technology, are enabled for use when the second wireless technology that uses antenna 3 is inactive. In FIG. 7B, antenna 2 is enabled and antenna 1 is disabled when the second wireless technology becomes active.

Figure 8A:
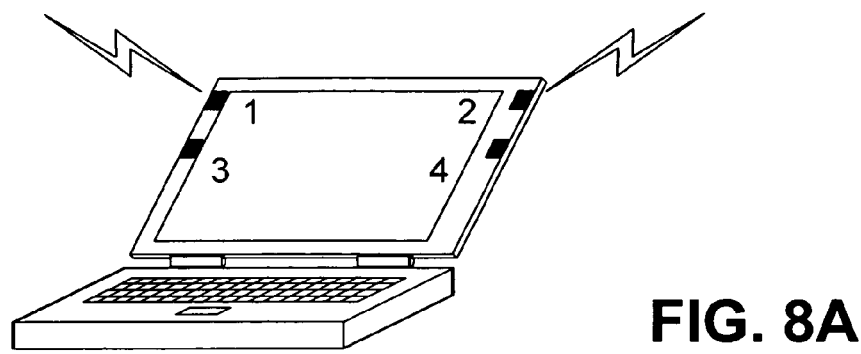
FIGS. 8A-8D illustrate example antenna management schemes for a second antenna configuration.
Figure 8B:
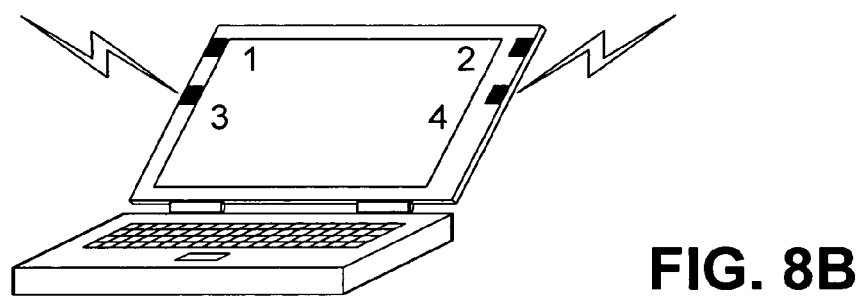
Figure 8C:
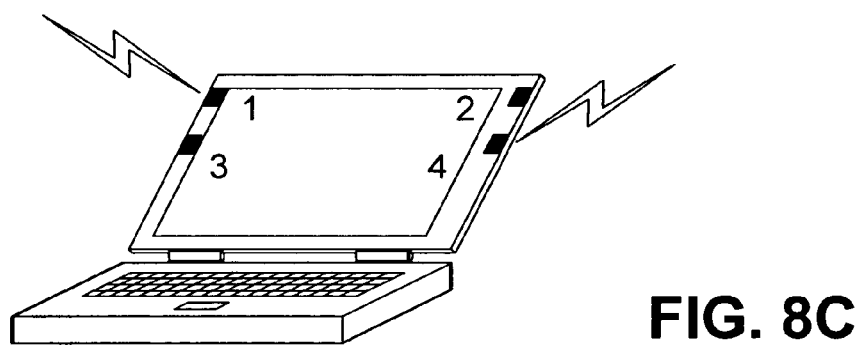
Figure 8D:
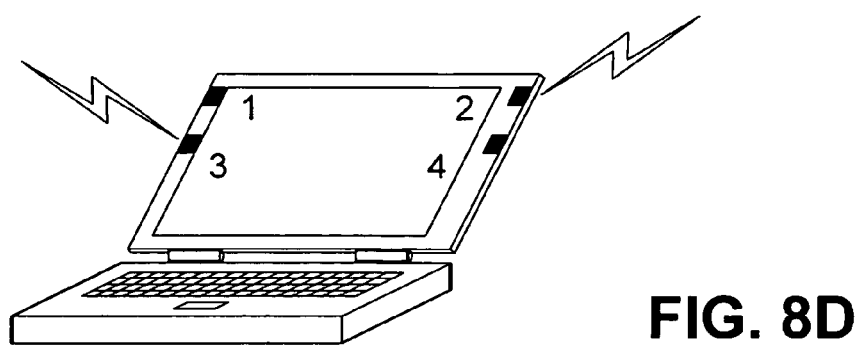

With reference to FIG. 8A, antennas 1 and 2, associated with a first wireless technology, are enabled for use when the second wireless technology that uses antennas 3 and 4 is inactive. In FIG. 8B, antennas 3 and 4, associated with the second wireless technology, are enabled for use when the first wireless technology that uses antennas 1 and 2 is inactive. In FIG. 8C, both wireless technologies are active, and one uses antenna 1 while the other uses antenna 4. In FIG. 8D, both wireless technologies are active, and one uses antenna 2 which the other uses antenna 3.

Although the above antenna management is described in terms of a software-based solution, it is noted that a hardware-based solution could instead be used. For example, in the embodiment described in relation to FIG. 6, instead of the antenna manager 226 providing a control signal to a device driver, the manager could instead directly control a switch 207 associated with an antenna to enable or disable the antenna.

What is claimed is:

1. A method for controlling antenna use in a computing device comprising a first antenna, a second antenna, and a third antenna, the first and second antennas being available for use by a first wireless technology and the third antenna being available for use by a second wireless technology, the third antenna being physically proximate to the first antenna but physically distant from the second antenna, the method comprising:

enabling switching between the first and second antennas while the first wireless technology is active so as to enable utilization of the antenna that receives the strongest signal;

determining whether the second wireless technology becomes active; and if the second wireless technology becomes active, disabling the switching and limiting use of the first wireless technology to the second antenna.

2. The method of claim 1, wherein determining comprises using a basic input-output system of the computing device.

3. The method of claim 1, wherein disabling comprises providing a transceiving device status accessible by transceiving device drivers of the computing device.

4. The method of claim 3, wherein providing a transceiving device status comprises providing a transceiving device status to an operating system of the computing device.

5. The method of claim 3, wherein providing a transceiving device status comprises updating a look-up table accessible by the transceiving device drivers.

6. The method of claim 1, further comprising providing a default antenna identification that indicates to transceiving device drivers which antenna to use.

7. The method of claim 1, further comprising selecting a default antenna for use by the first wireless technology using a transceiving device driver.

8. The method of claim 1, wherein disabling comprises providing a control signal to a transceiving device driver that indicates which of the first and second antennas the transceiving device is to use.

9. The method of claim 8, further comprising selecting an antenna using a transceiving device driver according to the control signal.

10. The method of claim 1, wherein disabling comprises controlling a physical switch associated with one of the first and second antennas.

11. A computer-readable medium that stores instructions for controlling antenna use in a computing device, the instructions being executable by a processor to cause the computing device to perform the following actions:

enabling a first wireless technology to switch between a first and a second antenna to enable utilization of the antenna that receives the strongest signal;

enabling a second wireless technology to use a third antenna that is proximate to the first antenna but distant to the second antenna;

determining when a second wireless technology becomes active; and disabling the switching and limiting the first wireless technology to use of the second antenna when the second wireless technology becomes active.

12. The computer-readable medium of claim 11, wherein the means for determining comprises a basic input-output system of the computing device.

13. The computer-readable medium of claim 11, wherein the means for disabling comprises means for providing a transceiving device status accessible by transceiving device drivers of the computing device and that indicates to the transceiving device drivers which antenna to use.

14. The computer-readable medium of claim 11, wherein the means for disabling comprises means for providing a control signal to a transceiving device driver that indicates which antenna the transceiving device is to use.

15. The computer-readable medium of claim 11, wherein the means for disabling comprises means for controlling a physical switch associated with an antenna.

16. A computing device for controlling antenna use in a computing device, the computing device comprising:

a first antenna available for use by a first wireless technology;

a second antenna also available for use by the first wireless technology;

a third antenna available for use by a second wireless technology, the third antenna being physically proximate to the first antenna but physically distant from the second antenna;

logic configured to enable switching between the first and second antennas while the first wireless technology is active so as to enable utilization of the antenna that receives the strongest signal;

logic configured to determine when the second wireless technology becomes active; and logic configured to disable switching use of the first antenna such that the first wireless technology may only use the second antenna when both wireless technologies are active.

17. The computing device of claim 16, wherein the logic configured to determine which wireless technologies are active comprises logic of a basic input-output system of the computing device.

18. The computing device of claim 16, wherein the logic configured to disable use of the first antenna comprises logic configured to provide a transceiving device status accessible by transceiving device drivers of the computing device and that indicates to the transceiving device drivers which antenna to use.

19. The computing device of claim 16, wherein the logic configured to disable use of the first antenna comprises logic configured to provide a control signal to a transceiving device driver that indicates which antenna the transceiving device is to use.

20. The computing device of claim 16, wherein the logic configured to disable use of the first antenna comprises logic configured to control a physical switch associated with the first antenna.

* * * * *